United States Patent
Angst et al.

(10) Patent No.: US 11,270,065 B2
(45) Date of Patent: Mar. 8, 2022

(54) EXTRACTING ATTRIBUTES FROM EMBEDDED TABLE STRUCTURES

(71) Applicant: INTERNATIONAL BUSINESS MACHINES CORPORATION, Armonk, NY (US)

(72) Inventors: Debra L. Angst, Rochester, MN (US); Jennifer Lynn La Rocca, Cary, NC (US); Kristin E. Mcneil, Charlotte, NC (US); Mario J. Lorenzo, Miami, FL (US); Rebecca Lynn Dahlman, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/564,324

(22) Filed: Sep. 9, 2019

(65) Prior Publication Data

US 2021/0073325 A1 Mar. 11, 2021

(51) Int. Cl.
| | |
|---|---|
| *G06F 17/00* | (2019.01) |
| *G06F 40/177* | (2020.01) |
| *G06F 16/93* | (2019.01) |
| *G06F 40/109* | (2020.01) |
| *G06F 40/169* | (2020.01) |
| *G06F 40/205* | (2020.01) |

(52) U.S. Cl.
CPC .......... *G06F 40/177* (2020.01); *G06F 16/93* (2019.01); *G06F 40/109* (2020.01); *G06F 40/169* (2020.01); *G06F 40/205* (2020.01)

(58) Field of Classification Search
CPC .................................................. G06F 40/177
See application file for complete search history.

(56) References Cited

U.S. PATENT DOCUMENTS

| | | | |
|---|---|---|---|
| 8,443,278 B2 | 5/2013 | Mansfield et al. | |
| 9,348,848 B2 | 5/2016 | Dong et al. | |
| 9,495,347 B2 | 11/2016 | Stadermann et al. | |
| 9,734,181 B2 * | 8/2017 | Wang | G06F 16/951 |
| 9,965,809 B2 | 5/2018 | Dejean | |
| 10,198,471 B2 | 2/2019 | He et al. | |
| 10,235,437 B2 | 3/2019 | Diwan et al. | |
| 10,241,992 B1 | 3/2019 | Middendorf et al. | |

(Continued)

OTHER PUBLICATIONS

Mell, Peter et al. "The NIST Definition of Cloud Computing" Recommendations of the National Institute of Standards and Technology, Sep. 2011; 7 pgs.

(Continued)

*Primary Examiner* — Mustafa A Amin
(74) *Attorney, Agent, or Firm* — Cantor Colburn LLP; Kelsey Skodje

(57) ABSTRACT

Embodiments include methods, system and computer program products for extracting attributes from embedded table structures in a document. Aspects include identifying a table in the document and identifying one or more headers of the table by locating co-occurring attributes in the table. Aspects also include identifying a plurality of values in the table and creating an annotation for each of the plurality of values value in the table, wherein each annotation includes text extracted from the one or more headers that correspond to the location of the value in the table.

9 Claims, 6 Drawing Sheets

(56) References Cited

U.S. PATENT DOCUMENTS

| | | | |
|---|---|---|---|
| 10,599,720 B2 * | 3/2020 | Moore | G06F 16/907 |
| 2006/0217959 A1 * | 9/2006 | Saito | G06F 40/253 |
| | | | 704/2 |
| 2015/0309990 A1 | 10/2015 | Allen et al. | |
| 2015/0379057 A1 * | 12/2015 | Wang | G06F 16/221 |
| | | | 707/723 |
| 2016/0048520 A1 * | 2/2016 | Levy | G06F 40/258 |
| | | | 707/748 |
| 2016/0104077 A1 | 4/2016 | Jackson, Jr. et al. | |
| 2016/0314104 A1 | 10/2016 | Phillips et al. | |
| 2017/0329749 A1 | 11/2017 | Milward et al. | |
| 2017/0364582 A1 | 12/2017 | Pan et al. | |
| 2018/0239959 A1 * | 8/2018 | Bui | G06F 40/103 |
| 2019/0129900 A1 | 5/2019 | Bernhardy et al. | |

OTHER PUBLICATIONS

Nagy, George et al., "Table Headers: An Entrance to the Data Mine", 2016 23rd Int'l Conf. on Pattern Recognition (ICPR), Dec. 4-8, 2016; 2016 IEEE, pp. 4054-4059.

Jerez-Arriaga, Martha O. et al. "TAO: System for Table Detection and Extraction of PDF Documents", Proceedings of the 29th Int'l Florida Artificial Intelligence Research Society Conference; 2016; pp. 591-596.

Sale, Mahesh A., et al. "Information Extraction from Web Tables", Int'l journal of Engineering Research and Application (IJERA); vol. 2, Issue 3, May-Jun. 2012, pp. 313-318.

Zhang, Ziqi "Effective and Efficient Semantic Table Interpretation using TableMiner" Semantic Web tbd (2016); IOS Press; pp. 1-39.

* cited by examiner

FIG. 2A

| DEDUCTIBLES, COINSURANCE, OUT-OF-POCKET LIMITS AND LIFETIME MAXIMUM BENEFIT | | |
|---|---|---|
| BENEFIT FEATURES | PAR PROVIDER BENEFIT | NON-PAR PROVIDER BENEFIT |
| Individual *Deductible* | $350 per covered person | $1,000 per covered person |
| Employee + Spouse or Same Sex Domestic Partner *Deductible* | $350 per covered person, no more than $700 per employee + spouse or domestic partner | $1,000 per covered person, no more than $2,000 per employee + spouse or domestic partner |
| Employee + Child(ren) *Deductible* | $350 per covered person, no more than $700 per employee + child (ren) | $1,000 per covered person, no more than $2,000 per employee + child (ren) |
| Family *Deductible* | $350 per covered person, no more than $1,050 per covered family | $1,000 per covered person, no more than $3,000 per covered family |
| *Coinsurance* | The Plan pays 85%, you pay 15% | The Plan pays 60%, you pay 40% |

2014 HSA Medical Plan Summary

| | Emory Provider Network (EPN) | In-Network | Out-of-Network |
|---|---|---|---|
| | The amounts in this chart represent the member's responsibility | | |
| *Deductible* | | | |
| Single | $1,350 | $1,350 | $2,000 |
| Family | $2,700 | $2,700 | $4,000 |
| *Out-of-Pocket Maximum* | | | |
| Single | $3,000 | $3,000 | $6,000 |
| Family | $6,000 | $6,000 | $12,000 |
| Aggregate | Yes | Yes | Yes |
| *Physician Fees (Primary Care Office Visits)* Includes services of an internist, general physician, family practitioner or pediatrician. Also includes dermatologist, behavioral health provider, and allergist. | 10% after deductible | 20% after deductible | 40% after deductible |

FIG. 2B

EXTRACTING ATTRIBUTES FROM EMBEDDED TABLE STRUCTURES

BACKGROUND

The present invention generally relates to processing documents, and more specifically, to extracting attributes from embedded table structures in documents.

In real-world solutions, documents tend to include embedded table structures along with unstructured text passages. Often times in medical literature, clinical studies, insurance policies, or other types of documents these tables contain integral information to support decision making. Presently, natural language processing (NLP) systems ignore these table structures when performing NLP functions to extract information. In order to support these use cases, tables must be interpreted and serve as a source of information along with unstructured text. However, no current NLP system is configured to extract information, other than unstructured text, from tables embedded in documents.

Accordingly, a need for a system to extract values and attributes from embedded table structures in documents.

SUMMARY

Embodiments of the present invention are directed to extracting attributes from embedded table structures in a document. A non-limiting example computer-implemented method includes identifying a table in the document and identifying one or more headers of the table by locating co-occurring attributes in the table. The computer-implemented method also includes identifying a plurality of values in the table and creating an annotation for each of the plurality of values value in the table, wherein each annotation includes text extracted from the one or more headers that correspond to the location of the value in the table.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 2A and 2B illustrate embedded table structures according to one or more embodiments of the present invention;

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a method for processing a document by extracting attributes from embedded table structures in the document. In exemplary embodiments, a table structure is identified in a document and the table is processed to identify table headers, attributes, and values. In exemplary embodiments, a natural language processing method that uses specific domain data elements of interest (such as concept vocabulary, values, and attributes) are used to process the table. Processing the table discovers the table headers by locating a dense concentration of attributes (specifically existence attributes, i.e. value-less) and values. Once the table has been processed, the values are annotated, or tagged, with the information extracted from the headers. As a result, the data extracted from the document is richer and much easier to parse and search.

Figure 1:
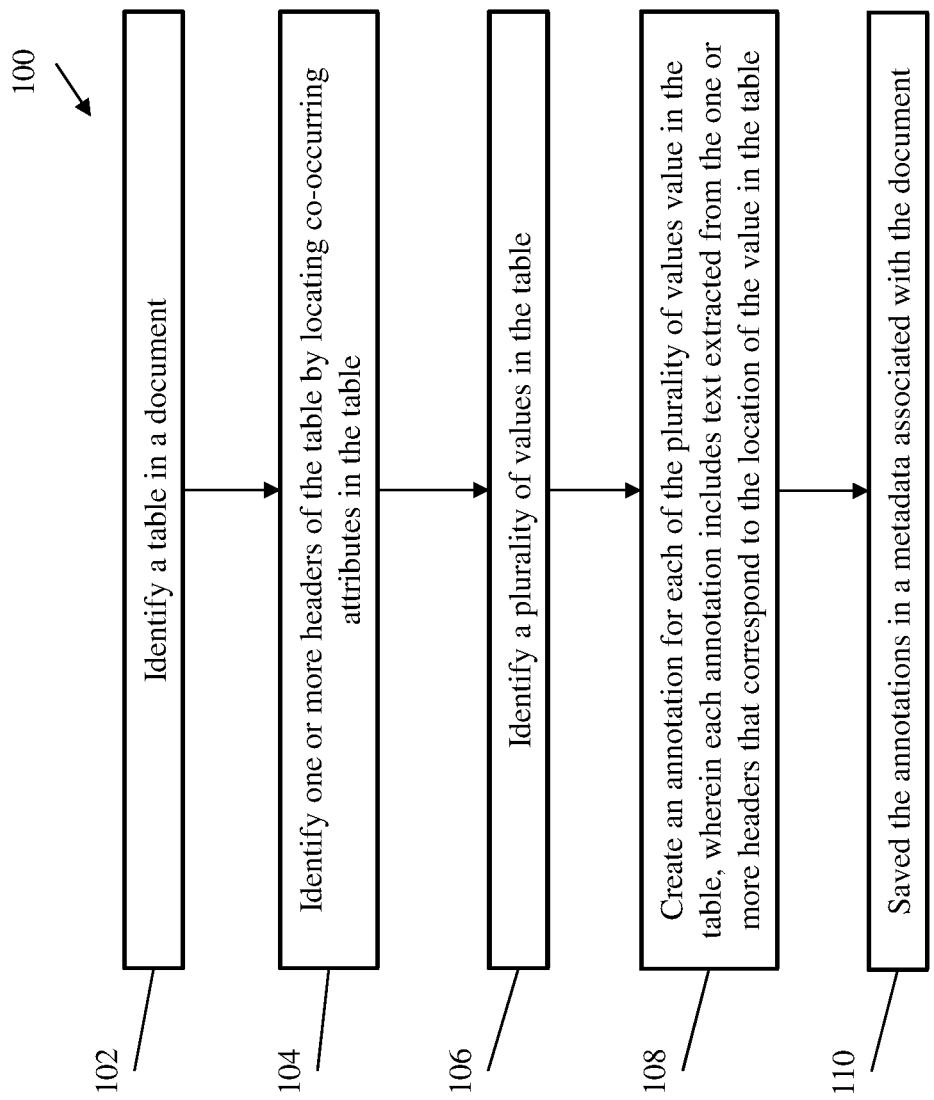
FIG. 1 illustrates a flow diagram of a method extracting attributes from embedded table structures in documents in accordance with one or more embodiments of the present invention.

Turning now to FIG. 1, a flow diagram of a method 100 processing a document by extracting attributes and values from embedded table structures in the document in accordance with an embodiment is shown. In one or more embodiments of the present invention, the method 100 may be embodied in software that is executed by computer elements located within a network that may reside in the cloud, such as the cloud computing environment 50 described hereinabove and illustrated in FIGS. 3 and 4. In other embodiments, the computer elements may reside on a computer system or processing system, such as the processing system 300 described hereinabove and illustrated in FIG. 5, or in some other type of computing or processing environment.

As illustrated, the method 100 begins at block 102 and includes identifying a table in the document. The documents can be native electronic documents or can be scanned documents, depending on the type of document different techniques are used to identify a table in the document. In an embodiment where the document is a native electronic document, a table is identified in the document by identifying a table structure in a document, such as a comma delineated or space delimited structure. In an embodiment where the document is a scanned document, a table is identified in the document by applying an image recognition algorithm to identify structured blocks of text. Next, as shown at block 104, the method 100 includes identifying one or more headers of the table by locating co-occurring attributes in the table. In exemplary embodiments, the attributes are obtained from a cartridge that includes specific domain data elements of interest. The cartridge is selected upon a type of the document, which includes, but is not limited to, one of a medical document, an insurance document, and a financial document. For example, a cartridge for an insurance document includes attributes such as deductible out-of-pocket-maximum, benefit, in-network, etc.

In exemplary embodiments, identifying one or more headers of the table includes analyzing a font styling to identify one or more candidate headers. The candidate headers are further analyzed by performing attribute detection on the candidate header and measuring a concentration of attributes identified. Based on the concentration of attributes identified exceeding a threshold value, the candidate headers are treated as a header. In exemplary embodiments, the identified headers are further classified as primary headers or qualifying headers, as discussed in more detail below.

Continuing with reference to FIG. 1, the method 100 also includes identifying a plurality of values in the table, as shown at block 106. In exemplary embodiments, the identified headers include at least one column header and at least one row header and the plurality of values in the table are located in between the at least one column header and the at least one row header. In another embodiment, the plurality of values in the table are identified based on the identified structure of the table, i.e., the comma or space-delimited numerical values are treated as the plurality of values. Next, as shown at block 108, the method 100 includes creating an annotation for each of the plurality of values value in the table. Each annotation includes text extracted from the one or more headers that correspond to the location of the value in the table. The method 100 concludes at block 110 by saving the annotations in metadata associated with the document.

Referring now to FIG. 2A, an example of an embedded table structure 200 is shown. As illustrated the embedded table structure 200 includes a table header 202, a plurality of column headers 204, a plurality of row headers 206 and a plurality of values 208. In exemplary embodiments, the document containing the embedded table structure 200 has been identified as an insurance document and natural language processing using a cartridge specific to insurance documents is performed. The NLP identifies attributes based on the ontology specified in the cartridge. The concentration of the attributes is used to identify the headers 202, 204 and 206 in the embedded table structure 200. In exemplary embodiments, the font styling of the text used in the headers 202 and 204 can be used to identify those sections of the embedded table structure 200 as a header. As illustrated, the plurality of values 208 can include text in addition to numerical values.

Referring now to FIG. 2B, an example of an embedded table structure 250 is shown. As illustrated the embedded table structure 200 includes a table header 252, a plurality of column headers 254, a plurality of row headers 256a, 256b and a plurality of values 258. In exemplary embodiments, the document containing the embedded table structure 250 has been identified as an insurance document and natural language processing using a cartridge specific to insurance documents is performed. The NLP identifies attributes based on the ontology specified in the cartridge. The concentration of the attributes is used to identify the headers 252, 254 and 256a, 256b in the embedded table structure 250.

In exemplary embodiments, the plurality of row headers 256a, 256b are split into two groups with row headers 256b being primary headers and row headers 256a being qualifying headers. The primary headers are headers that have values 258 in the corresponding row/column while the qualifying headers do not have values in the corresponding row/column. In exemplary embodiments, the values 258 are annotated, or tagged, with the information from each of the column headers 254 and row headers 256a, 256b that correspond to the values. For example, the value of $4,000 shown in FIG. 2B would be annotated with "Out-of-Network", "Family" and "Deductible." In exemplary embodiments, differences in the font styling of the text in the body of the headers are also used to distinguish between primary and qualifying headers.

In exemplary embodiments, when processing a table the first row or column identified as a header is analyzed to determine if the header is a primary header or a qualifying header. Primary headers are headers that are value-less, i.e., the headers do not have values in their corresponding rows/columns. After a primary header is identified, the next adjacent header row or column is inspected until a concentration of values is encountered, indicating that the header is a primary header. After a concentration of values is encountered, the processing proceeds to the orthogonally adjacent header to repeat the search for the concentration of value-less attributes in a similar fashion in order to classify the headers as primary or qualifying headers.

In exemplary embodiments, once the primary header and qualifying headers have been identified, the processing iterates through the table cells identifying cells that contain values. These cells are located in between the qualifying row headers and qualifying column headers previously located. Each value extracted is then annotated, or tagged, with the data from the corresponding row and column headers, both primary and qualifying headers.

In an exemplary embodiment, the NLP processing performed on the document is used to identify cognitive qualifiers in addition to attributes. The cognitive qualifiers are obtained from a cartridge that includes specific domain data elements of interest. The cartridge is selected upon a type of the document, which includes, but is not limited to, one of a medical document, an insurance document, and a financial document. In these embodiments, the headers are identified by locating co-occurring attributes and cognitive qualifiers in the table.

Additional processes may also be included. It should be understood that the processes depicted in FIG. 1 represents an illustration, and that other processes may be added or existing processes may be removed, modified, or rearranged without departing from the scope and spirit of the present disclosure.

Figure 3:
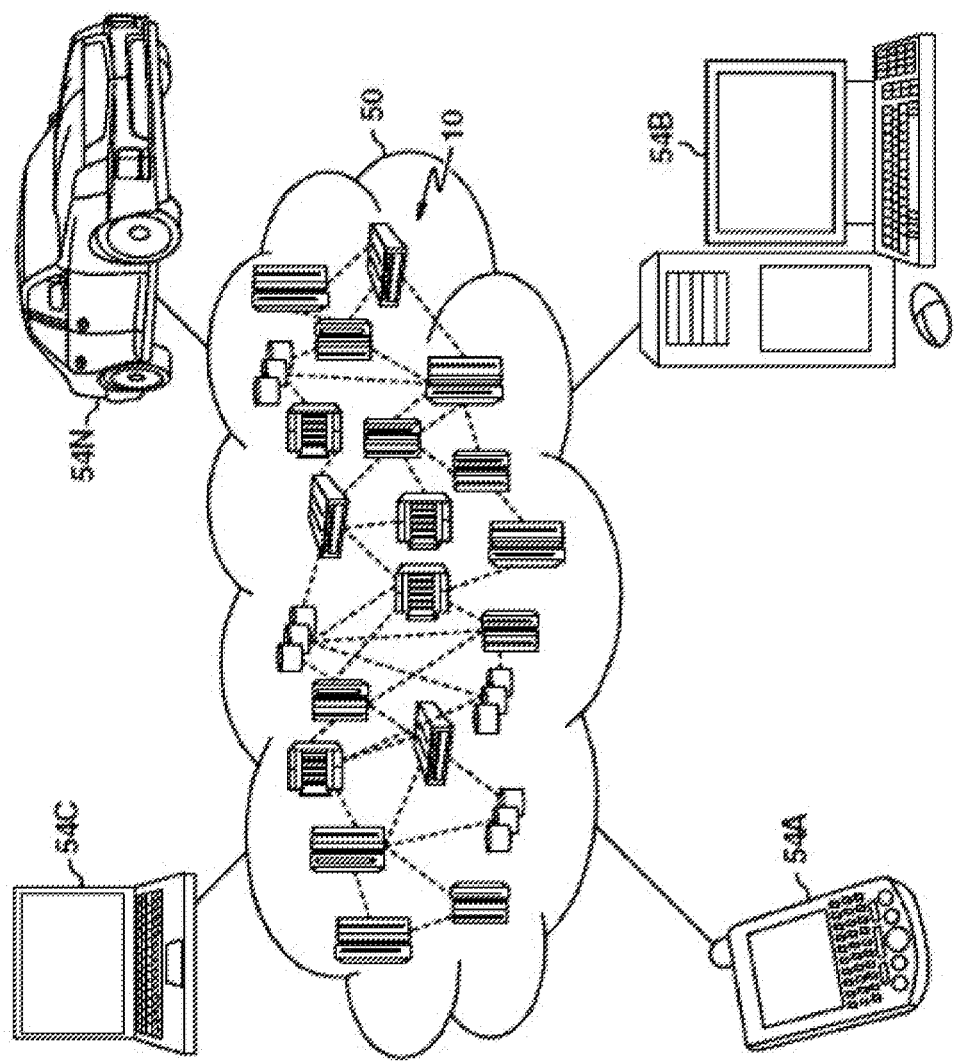
FIG. 3 illustrates a cloud computing environment according to one or more embodiments of the present invention.
Figure 4:
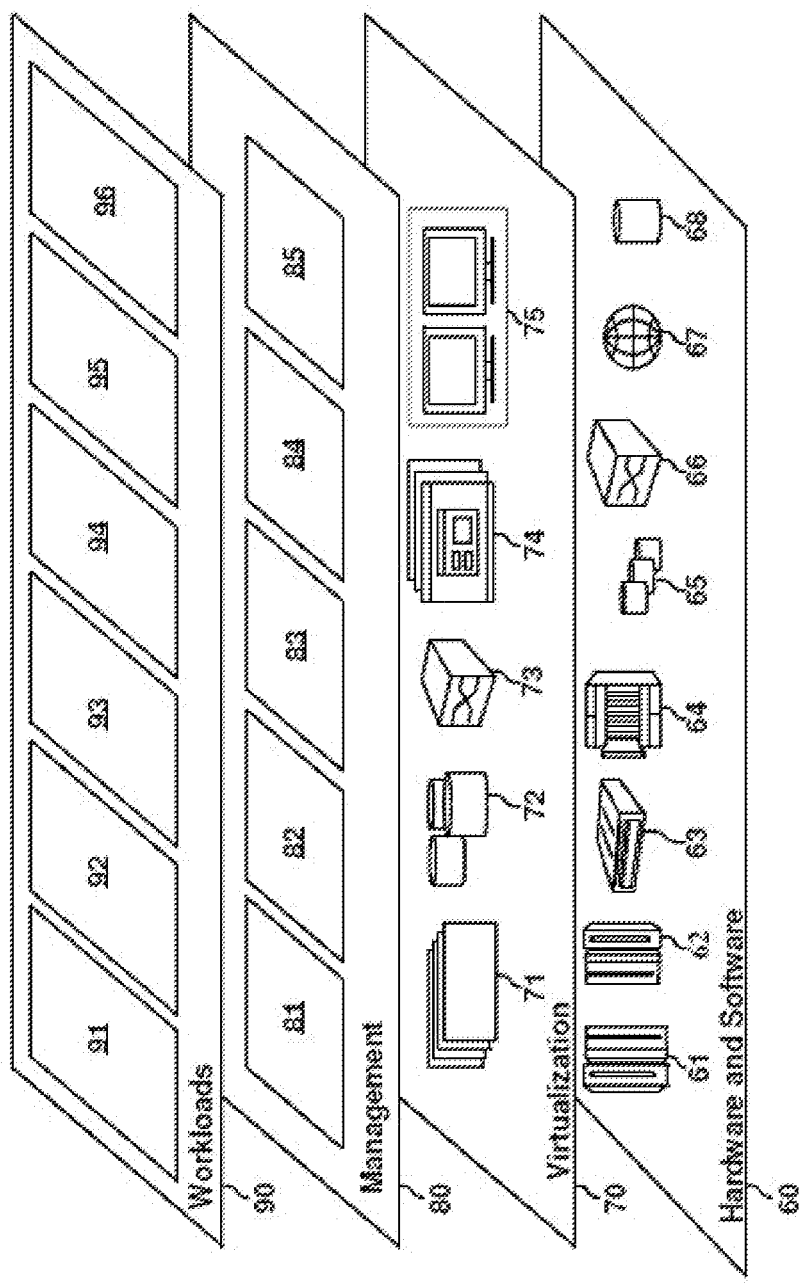
FIG. 4 illustrates abstraction model layers according to one or more embodiments of the present invention.

FIG. 3 depicts a cloud computing environment according to one or more embodiments of the present invention. FIG. 4 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (S3S): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (P3S): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (I3S): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing scanned documents 96.

Figure 5:
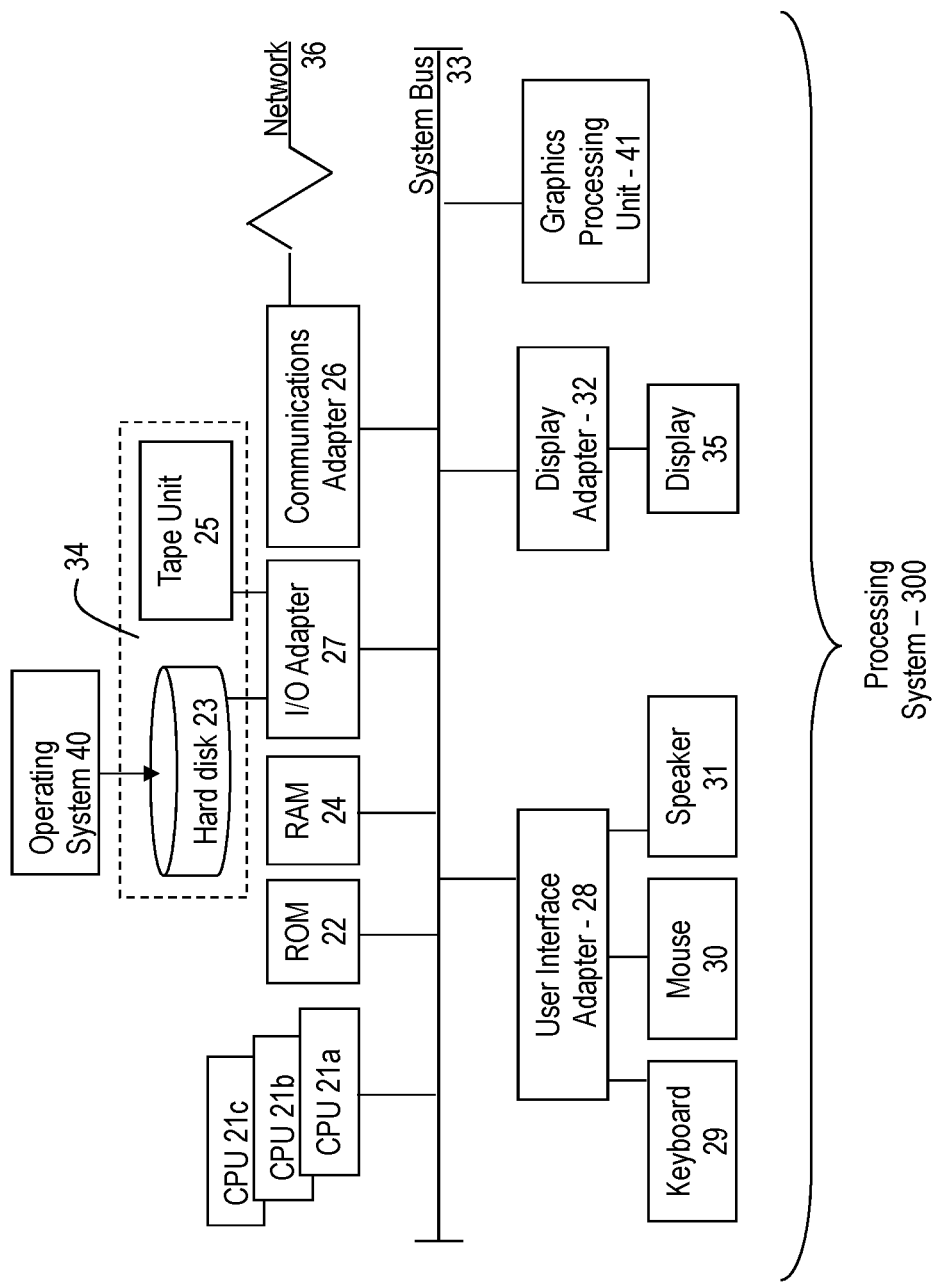
FIG. 5 illustrates a block diagram of a computer system for use in implementing one or more embodiments of the present invention.

FIG. 5 depicts a processing system for implementing one or more embodiments of the present invention. It is understood that one or more embodiments of the present invention are capable of being implemented in conjunction with any other type of computing environment now known or later developed. For example, FIG. 5 depicts a block diagram of a processing system 300 for implementing the techniques described herein. In accordance with one or more embodiments of the present invention, system 300 is an example of a cloud computing node 10 of FIG. 4. In the embodiment shown in FIG. 5, processing system 300 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 300.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 300 can be stored in mass storage 34. The RAM 24, ROM 22, and mass storage 34 are examples of memory 19 of the processing system 300. A network adapter 26 interconnects system bus 33 with an outside network 36 enabling the processing system 300 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 300 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 300.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of extracting attributes from embedded table structures in a document, the method comprising:
    determining a type of the document;
    obtaining attributes from a cartridge that includes specific domain data elements of interest, wherein the cartridge is selected upon the type of the document and wherein the attributes include specific domain data elements of interest for the type of document;
    identifying a table in the document;
    identifying one or more candidate headers of the table by analyzing a font styling;
    identifying one or more headers from the one or more candidate headers based on a determination that a concentration of attributes in one or more candidate headers exceeds a threshold value;
    classifying the one or more headers as a primary header primary based on a determination that a numerical value is present in a corresponding row/column of the one or more headers;
    classifying the one or more headers as a qualifying header based on a determination that a numerical value is not present in the corresponding row/column of the one or more headers;
    identifying a plurality of values in the table; and
    creating an annotation for each of the plurality of values value in the table, wherein each annotation includes text extracted from the one or more headers that correspond to the location of the value in the table.

2. The method of claim 1, wherein the type of document includes one of a medical document, an insurance document, and a financial document.

3. The method of claim 1, wherein the one or more headers of the table are identified as at least one column header and at least one row header and wherein the plurality of values in the table are located in between the at least one column header and the at least one row header.

4. A system comprising:
    a memory having computer readable instructions; and
    one or more processors for executing the computer readable instructions, the computer readable instructions controlling the one or more processors to perform operations comprising:
    determining a type of the document;
    obtaining attributes from a cartridge that includes specific domain data elements of interest, wherein the cartridge is selected upon the type of the document and wherein the attributes include specific domain data elements of interest for the type of document;
    identifying a table in the document;
    identifying one or more headers of the table by analyzing a font styling;
    identifying one or more headers from the one or more candidate headers based on a determination that a concentration of attributes in one or more candidate headers exceeds a threshold value;
    classifying the one or more headers as a primary header primary based on a determination that a numerical value is present in a corresponding row/column of the one or more headers;
    classifying the one or more headers as a qualifying header based on a determination that a numerical value is not present in the corresponding row/column of the one or more headers;

identifying a plurality of values in the table; and creating an annotation for each of the plurality of values value in the table, wherein each annotation includes text extracted from the one or more headers that correspond to the location of the value in the table.

5. The system of claim 4, wherein the type of document includes one of a medical document, an insurance document, and a financial document.

6. The system of claim 4, wherein the one or more headers of the table are identified as at least one column header and at least one row header and wherein the plurality of values in the table are located in between the at least one column header and the at least one row header.

7. A computer program product comprising a computer readable storage medium having program instructions embodied therewith, the program instructions executable by a computer processor to cause the computer processor to perform a method comprising:

determining a type of the document;

obtaining attributes from a cartridge that includes specific domain data elements of interest, wherein the cartridge is selected upon the type of the document and wherein the attributes include specific domain data elements of interest for the type of document;

identifying a table in the document;

identifying one or more headers of the table by analyzing a font styling;

identifying one or more headers from the one or more candidate headers based on a determination that a concentration of attributes in one or more candidate headers exceeds a threshold value;

classifying the one or more headers as a primary header primary based on a determination that a numerical value is present in a corresponding row/column of the one or more headers;

classifying the one or more headers as a qualifying header based on a determination that a numerical value is not present in the corresponding row/column of the one or more headers;

identifying a plurality of values in the table; and creating an annotation for each of the plurality of values value in the table, wherein each annotation includes text extracted from the one or more headers that correspond to the location of the value in the table.

8. The computer program product of claim 7, wherein the type of document includes one of a medical document, an insurance document, and a financial document.

9. The computer program product of claim 7, wherein the one or more headers of the table are identified as at least one column header and at least one row header and wherein the plurality of values in the table are located in between the at least one column header and the at least one row header.

* * * * *